(12) United States Patent
Berson et al.

(10) Patent No.: US 6,754,821 B1
(45) Date of Patent: Jun. 22, 2004

(54) SYSTEM, METHOD AND ARTICLE OF MANUFACTURE FOR TRANSITION STATE-BASED CRYPTOGRAPHY

(75) Inventors: Thomas A. Berson, Palo Alto, CA (US); R. Drews Dean, Cupertino, CA (US); Matthew K. Franklin, Palo Alto, CA (US); Teresa F. Lunt, Palo Alto, CA (US); Diana K. Smetters, Burlingame, CA (US)

(73) Assignee: Xerox Corporation, Stamford, CT (US)

( * ) Notice: Subject to any disclaimer, the term of this patent is extended or adjusted under 35 U.S.C. 154(b) by 864 days.

(21) Appl. No.: 09/596,834

(22) Filed: Jun. 19, 2000

(51) Int. Cl.[7] .............................................. G06F 11/30
(52) U.S. Cl. ....................... 713/170; 713/182; 713/189; 713/200; 713/201
(58) Field of Search ................................ 713/170, 182, 713/189, 200, 201

(56) References Cited

U.S. PATENT DOCUMENTS

| | | | |
|---|---|---|---|
| 5,673,316 A | | 9/1997 | Auerbach et al. ............... 380/4 |
| 5,790,664 A | | 8/1998 | Coley et al. .................... 380/4 |
| 5,802,176 A | * | 9/1998 | Audebert .................... 713/184 |
| 5,862,220 A | * | 1/1999 | Perlman ...................... 713/162 |
| 5,956,404 A | | 9/1999 | Schneier et al. .............. 380/25 |
| 5,991,399 A | * | 11/1999 | Graunke et al. ............ 380/279 |
| 5,995,625 A | | 11/1999 | Sudia et al. .................. 380/25 |
| 6,055,508 A | | 4/2000 | Naor et al. .................... 705/11 |
| 6,078,663 A | | 6/2000 | Yamamoto ..................... 380/9 |
| 6,269,157 B1 | | 7/2001 | Coyle ......................... 379/114 |
| 6,304,915 B1 | * | 10/2001 | Nguyen et al. ............. 709/250 |

FOREIGN PATENT DOCUMENTS

| | | |
|---|---|---|
| EP | 0 736 827 A2 | 10/1996 |
| WO | WO 98/42098 | 9/1998 |
| WO | WO 98/52316 | 11/1998 |

* cited by examiner

*Primary Examiner*—Thomas R. Peeso

(57) ABSTRACT

A system, method and article of manufacture are provided for transition state-based cryptography in an application including at least one state having a state key associated with it. A request for access is sent to a server utilizing a network upon reaching a state in the application. The request includes a state key associated with the state. A reply is received from the server in response to the request. The reply includes an access key for providing the access if the state key is valid. According to another embodiment of the present invention, a method is provided for transition state-based cryptography in an application including at least one state having a state key associated with it. A request for access is received from a client to a server utilizing a network. The state key is verified at the server. A reply is sent from the server in response to the request. The reply includes an access key for providing the access if the state key is verified. In one aspect of the present invention, the request for access is for a subsequent state in the application.

34 Claims, 7 Drawing Sheets

SYSTEM, METHOD AND ARTICLE OF MANUFACTURE FOR TRANSITION STATE-BASED CRYPTOGRAPHY

FIELD OF THE INVENTION

The present invention relates generally to data encryption and, more particularly, to using state-based encryption for modal protection of data.

BACKGROUND OF THE INVENTION

There are many applications where one desires data to be available in a useable form only after some sequence of actions has occurred. Current applications withhold the data from the user until notification that the sequence of actions is complete. However, the data, if stored on the user's system on a computer readable medium such as a hard drive, CD-ROM, DVD-ROM, etc., is susceptible to access by the user. Even if access to the data is protected by a cryptographic key stored on the user's system, a skilled user can obtain the key and access the data.

To overcome this problem, the prior art suggests withholding the data at a location remote from the user and sending the data over a network upon receipt of a notification that all predefined conditions have been met. In such cases, a number of problems arise in ensuring that the designated key necessary for decryption is securely communicated to the receiver. Sending large amounts of data over a network has undesirable costs in bandwidth.

Key and Encryption Technology

In a public key encryption scheme (also known as an asymmetric encryption scheme), cryptographic keys occur in pairs: one of the pair is a private key that is kept confidential, and the other of the pair is a public key that can be made available to anyone. When data is encrypted using one of the keys (either the public key or the private key), the other key must be used to decrypt the data. For example, resource A encrypts data using a private asymmetric cryptographic key belonging to A. Resource A makes the corresponding public asymmetric cryptographic key available publicly. The only key that can properly decrypt the data is the public key corresponding to the private key with which the data was encrypted. When resource B receives the data, it uses resource A's public key to decrypt the data. If the data decrypts properly, resource B is certain that only resource A, the sole holder of the corresponding private key, could have encrypted the data. In this way, resource B knows that the data must have originated from resource A, i.e., that the data purportedly from resource A is authentic.

Further, it is not unusual for the sender and receiver to be located at a considerable distance from each other. Because of this, data sent over the network is susceptible to interception by third parties. A secure channel, such as a courier service, may be used to communicate the data. However, such channels tend to be expensive, slow, and perhaps even unsecured in instances where the trustworthiness of the courier is compromised.

What is needed is a way to maintain the data to be accessed on or with the user's system, rather then at a distance across a channel that must be secured.

SUMMARY OF THE INVENTION

The present invention relates to state-based cryptography. More particularly, the present invention protects the confidentiality of data until some predefined condition has occurred. For example, workers, players, soldiers, etc. need to meet certain objectives, such as, a purchase requisition acquiring signatures in a workflow application, reaching a certain place in a game, or some militarily relevant objective, such as reaching a certain physical location on a military map, before learning what they are supposed to do next. While this could be done by storing the data remotely and not giving the data to the worker/player/soldier/etc. until necessary, this has undesirable costs in bandwidth.

Accordingly, a system, method and article of manufacture are provided for transition state-based cryptography in an application including at least one state with an associated state key. Such an application can be a workflow application, a game or a military application, for example. Upon reaching a state in the application, a request for access is sent via a network such as a local area network, a wide area network, wireless network, the Internet, etc., to a server. The request includes a state key associated with the state. The server attempts to validate the state key. A reply is sent from the server to the application in response to the request. The reply includes an access key if the state key is valid. This access key provides access to the next state in an application.

As an option, the request is encrypted prior to being sent. The reply can also be encrypted. In an aspect of the present invention, the request for access is for a subsequent state in the application.

In one aspect of the present invention, the application is a workflow application. The access key can allow display of a document after a prespecified criterion has been met.

In another aspect of the present invention, the application is a game, such as a single or multiplayer game. As an option, the access key allows progression to a subsequent portion of the game. In a further aspect of the present invention, the application is a military application, such as one that includes a map. The state key allows access to the portion of the map corresponding to the current, relevant portion of the military plan.

Note that our approach differs from the prior art in that the application's state data kept locally, and only the access keys are kept remotely, whereas in previous approaches the application data is kept remotely. Our approach thus confers many advantages over the prior art, including a savings in network bandwidth. This savings is realized because it is not necessary to move potentially large quantities of application data from the server to the application across a network. Also, because in some application, no application data is being sent across a network to the server, in those applications it may not be necessary to secure the channel between the application and the server. Even if the state keys or access keys were to be intercepted by a third party, in some applications the eavesdropper would learn nothing about the application data.

BRIEF DESCRIPTION OF THE DRAWINGS

The foregoing and other objects, aspects and advantages are better understood from the following detailed description of a preferred embodiment of the invention with reference to the drawings, in which.

DESCRIPTION OF THE PREFERRED EMBODIMENTS

Figure 1:
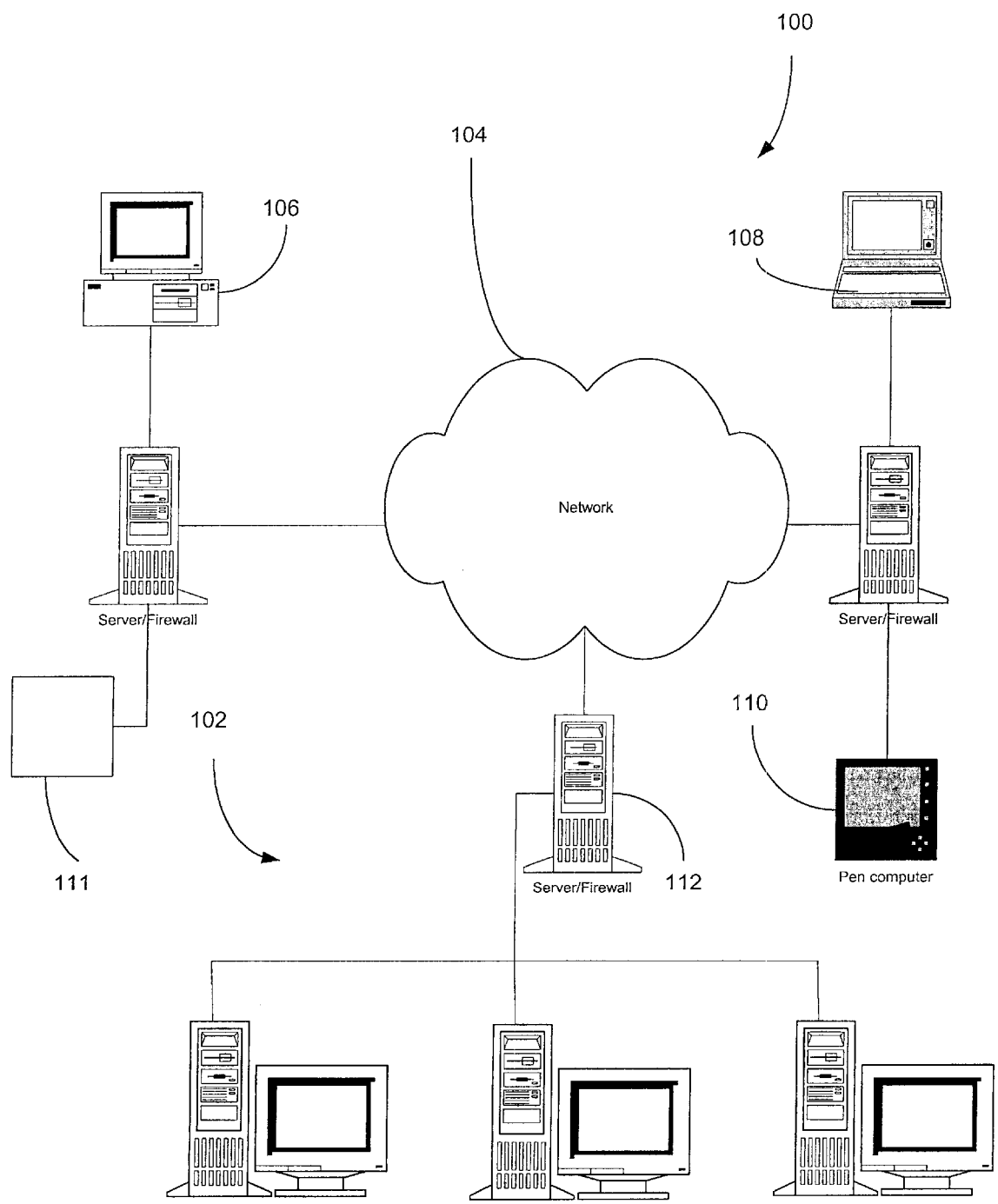
FIG. 1 illustrates an illustrative system with a plurality of components in accordance with one embodiment of the present invention.

A system, method and article of manufacture are provided for transition state-based cryptography in an application including at least one state having a state key associated with it is disclosed. State-based cryptography provides significant advancements, which can be most clearly illuminated by contrasting them to existing art.

First, many mechanisms which could be used to implement the ideas presented herein can be seen as generalizations of plaintext chaining modes for block ciphers. In these modes, the encryption of a given block of data depends in part on the plaintext of the previous data block—therefore it is impossible to decrypt block n without having previously decrypted block n-1. (This can be simply generalized to encryption of block n with a key which depends in part on the plaintext of block n-1.) Such chaining modes operate only over a linear history, while a preferred embodiment comprises state-dependent security computations that operate over a branching history.

Second, many apparently related systems can be grouped under the rubric of "state-based security." In such systems, access to information is only available after a principal has achieved some state. For instance, standard access control list-based security schemes allow a principal access to data (a state change) as a function of whether or not he or she is on a relevant list. So-called cheat codes for games are similar, allowing a player access to additional resources if he or she types in a magic word. Standard controlled software distribution schemes allow a user to use a piece of software after typing in a key or license number, or plugging in a hardware-based access control device or "dongle," received in return for payment for the software. Network-aware software may only run if a distinguished server claims there are available licenses for that software package on the local network at this time.

Contrast such state-based security schemes with the main thrust of this proposal, namely state-based cryptography. In state-based cryptography, cryptographic operations and keys are themselves functions of both the current state and history of the user or process attempting to perform those cryptographic operations. State-based cryptography can be used to implement state-based security, but can be used for other things as well, and most, if not all current approaches to state-based security are not implemented using state-based cryptography.

The only current examples of state-based security schemes implemented using cryptographic operations come in the form of simple challenge-response protocols: the desired data is encrypted using a standard algorithm, and the user attempting to access the data receives a key in response to, for instance, calling a credit-card processing center to pay for the software (e.g. Adobe Type On Call). Such simple schemes allow software manufacturers to distribute many programs on one CD, each encrypted under a different key. A user gets only the keys for those programs he or she has paid for. Similarly, DVDs are used to distribute encrypted movies, where each movie is encrypted under its own key, and that key is found on the DVD encrypted under 400 "player keys" controlled by the licensed DVD player manufacturers. When a user attempts to play a DVD with such a licensed player, the player is able to decrypt a copy of the content encryption key and play the movie, thus completing the challenge response protocol (the challenge being the encrypted keys, the response being a licensed player's ability to successfully decrypt a valid content key). It is possible that these schemes could be considered as examples of state-based cryptography, but if so they are naive and simple ones with at most one or two states.

Hardware Implementations

FIG. 1 illustrates an exemplary system 100 with a plurality of components 102 in accordance with one embodiment of the present invention. As shown, such components include a network 104 which take any form including, but not limited to a local area network, a wide area network such as the Internet, etc. Coupled to the network 104 is a plurality of computers which may take the form of desktop computers 106, lap-top computers 108, hand-held computers 110, or any other type of computing hardware/software 111. As an option, the various computers may be connected to the network 104 by way of a server 112 which may be equipped with a firewall for security purposes. It should be noted that any other type of hardware or software may be included in the system and be considered a component thereof.

Figure 2:
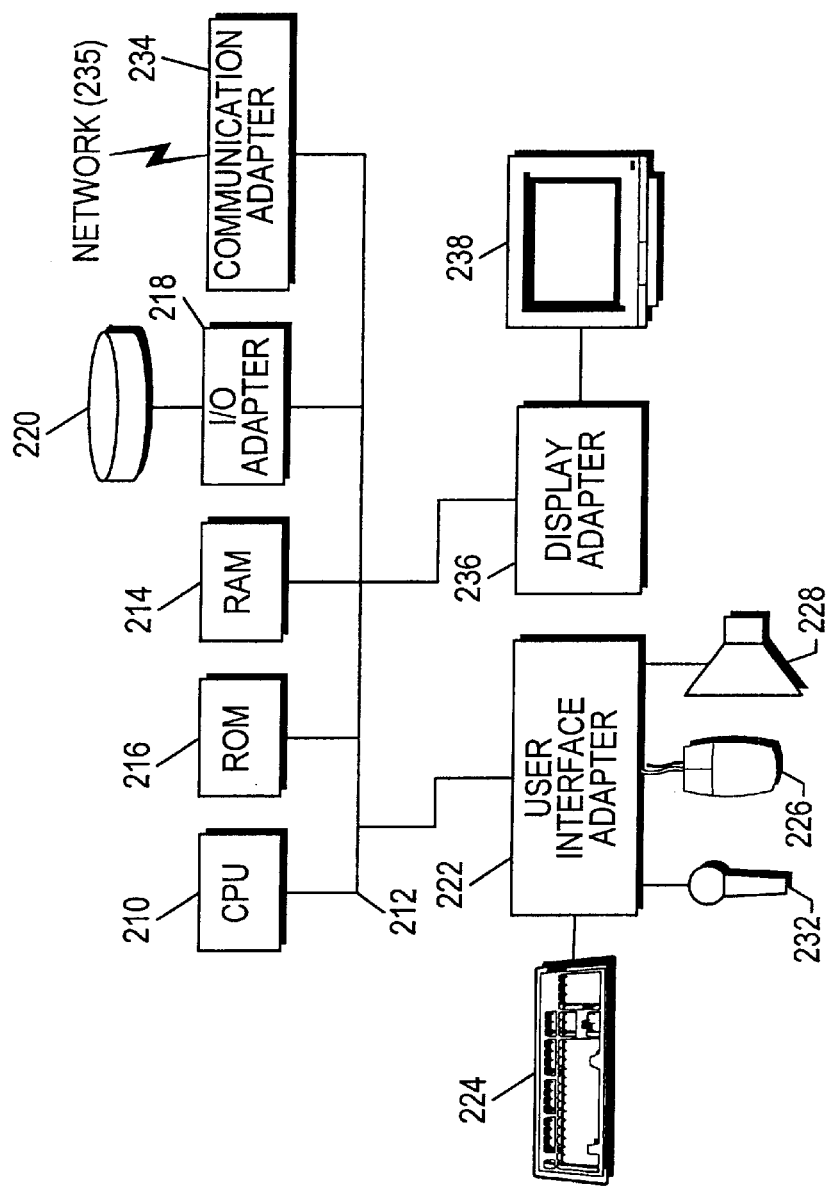
FIG. 2 illustrates a representative hardware environment in accordance with one embodiment of the present invention.

A representative hardware environment associated with the various components of FIG. 1 is depicted in FIG. 2. In the present description, the various sub-components of each of the components may also be considered components of the system. For example, particular software modules executed on any component of the system may also be considered components of the system. FIG. 2 illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network (e.g., a data processing network) and a display adapter 236 for connecting the bus 212 to a display device 238.

Processes

Figure 3:
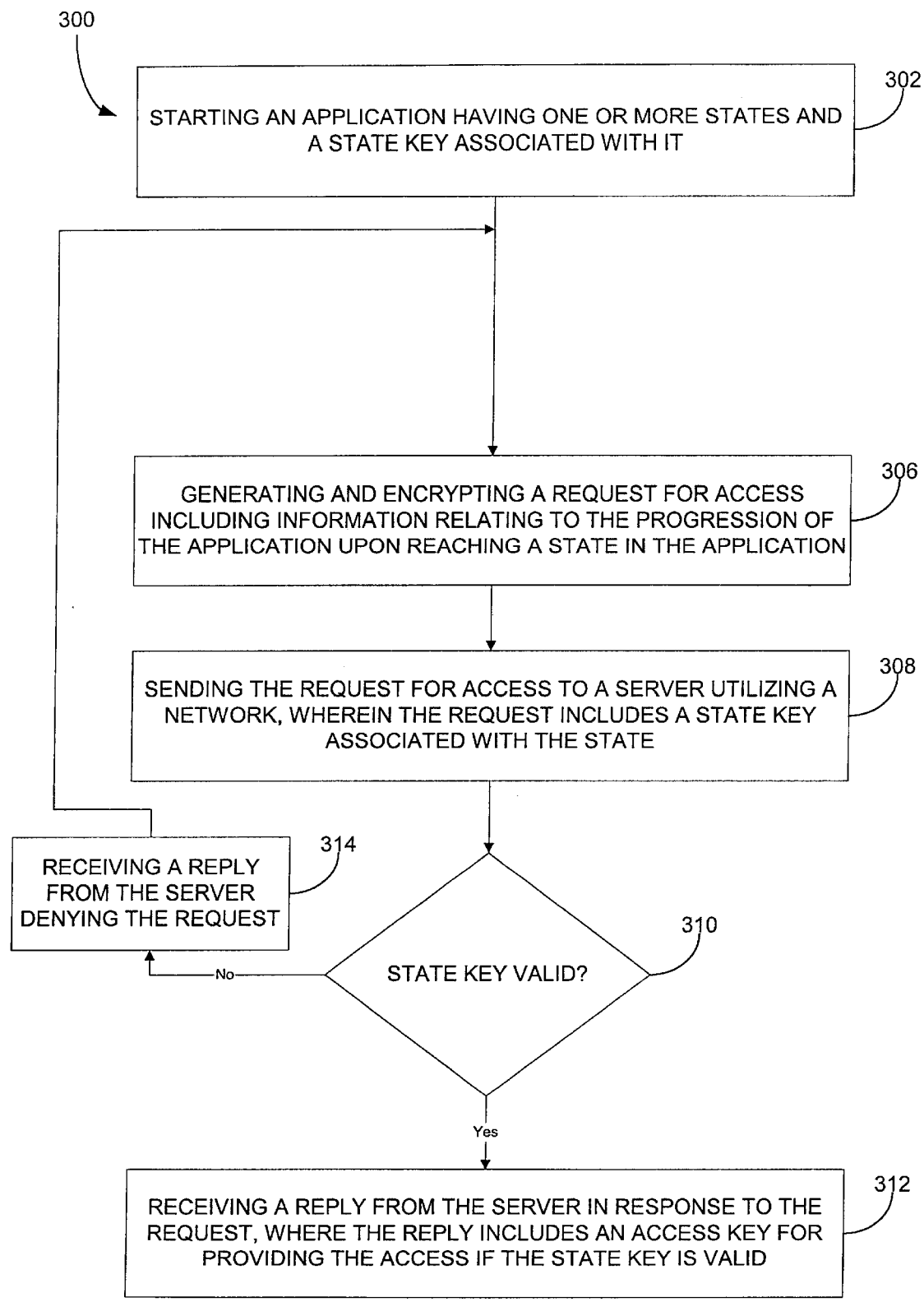
FIG. 3 is a flowchart of a process for transition state-based cryptography in accordance with an embodiment of the present invention.

FIG. 3 is a flowchart of a process 300 for transition state-based cryptography in an application that has at least one state having a state key associated with it. Such applications can be, but are not limited to, workflow applications, computer games and military maps. In all cases, the present invention seeks to protect the confidentiality of data stored at or accessible by the user's system until some predefined condition has occurred. In other words, the present invention allows data to be available in a useable form only after some sequence of actions has occurred. For example, workers, players, or soldiers, need to meet certain objectives, e.g., a purchase requisition acquiring signatures, reaching a certain place in the game, or some militarily relevant objective, such as reaching a certain physical location on a military map, before learning what they are supposed to do next or gaining permission to take the next step in the workflow.

With continued reference to FIG. 3, in operation 302, the application is executed. Upon reaching a potential change in state of the application, a request for access is generated and, optionally, encrypted in operation 306. The request for access may be for access to data and/or a subsequent state of the application.

As an option, the request can include information relating to the progression of the application, such as the user's progression through the application, which includes the input of tasks completed in the current and previous states and/or input by the user. In the examples set forth above, such information would include whether the signatures for the purchase requisition have been acquired, objectives or a position the player has reached in the game, and whether the militarily personnel have reached a certain physical location on the military map.

In operation 308, upon reaching a state in the application, the request for access is sent to a server via a network such as a local area network, a wide area network, wireless network, the Internet, etc. The request preferably includes a state key associated with the state. Each state in the system can be assigned its own key. The state key can include a portion (e.g., simple string or symbol) that represents certain conditions such as the user's progression through the application and/or tasks completed in the current and previous states. Alternatively, the state key can be selected from a list of state keys associated with the particular state and selected based on the particular predefined conditions that must be completed to progress to another state. One skilled in the art will understand that various permutations of the state key selection and/or generation can be utilized without straying from the scope and spirit of the present invention.

In decision 310, a determination is made at the server as to whether the state key is valid and/or whether the request should be granted based on the information included in the request. If so, in operation 312, a reply is received from the server in response to the request. The reply includes an access key for providing the access to the subsequent state or data. If the state key is determined to be invalid and/or the information included in the request is insufficient or denotes that the predefined condition has not occurred, a reply denying the request is received from the server in operation 314. In either case, the reply can be encrypted.

In an embodiment of the present invention in which the application is a game, such as a single or multiplayer game, the access key allows progression to a subsequent portion of the game. In an embodiment of the present invention in which the application is a workflow, the access key allows progression to a subsequent portion of the workflow. In an embodiment of the present invention in which the application is a military map, the access key allows progression to a subsequent portion of the military map.

Figure 4:
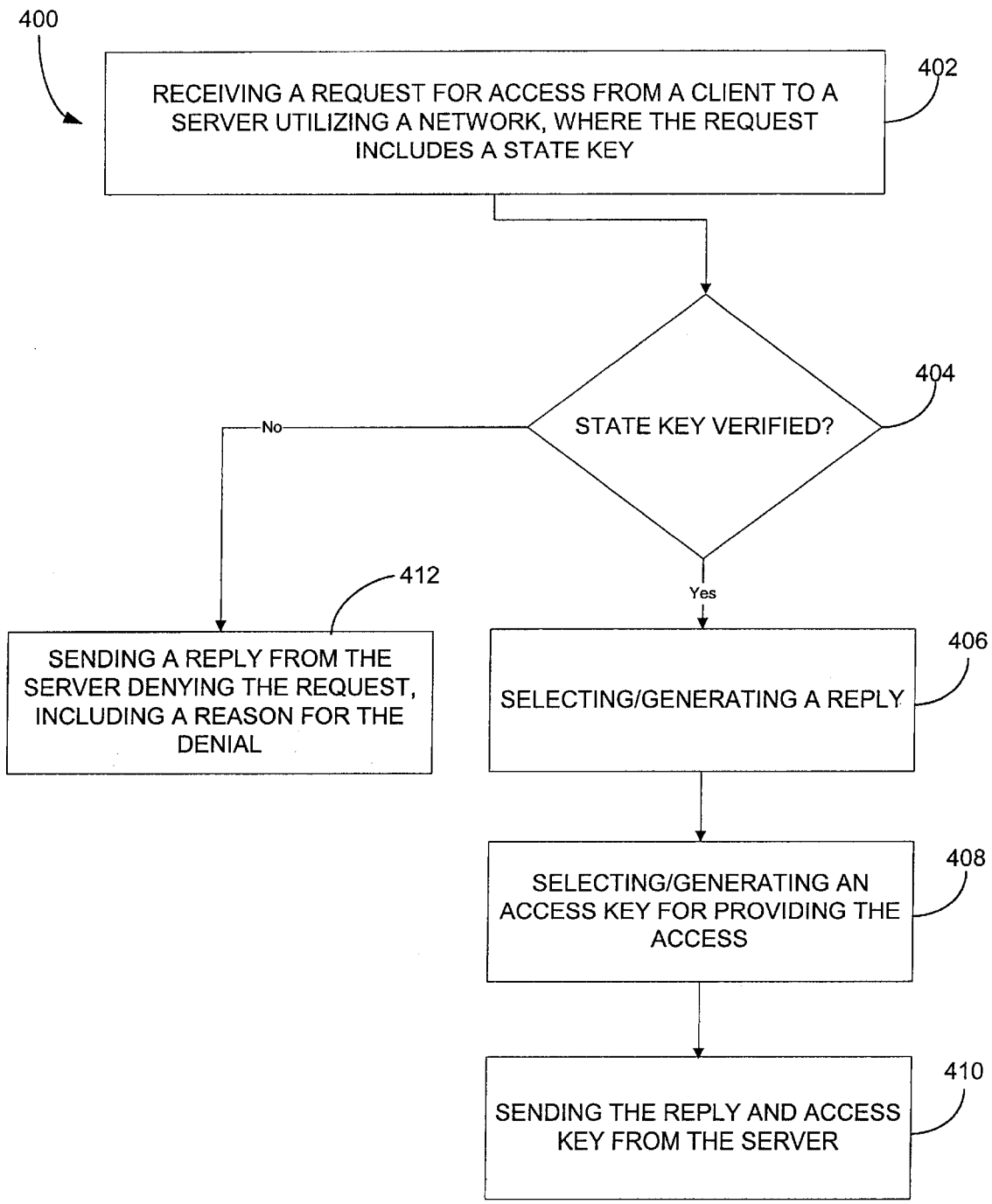
FIG. 4 is a flowchart depicting a process for secure workflow using transition state-based cryptography in accordance with another embodiment of the present invention.

FIG. 4 depicts a process 400 for transition state-based cryptography in an application including at least one state having a state key associated with the state. As above, such an application can be a workflow application, a game, or a military application, for example. In operation 402, when the application reaches a certain state, the application sends the server a request for access to the next state. The request includes a state key. The state key is verified at the server in decision 404. If the state key is verified, a reply is generated/selected at the server in response to the request in operation 406. An access key that provides the access is selected/generated in operation 408. The access key is included in the reply, which is sent from the server to the application in operation 410. If the state key is not verified, a reply is sent from the server denying the request, and optionally stating a reason for the denial. It should be noted that the various aspects of the embodiments of the present invention described with respect to FIG. 3 can be applied to the embodiment of FIG. 4 with minor modifications which will be readily understood by those skilled in the art.

Illustrative Embodiments

In an exemplary embodiment of the present invention that includes a workflow application, a purchasing agent is given access to a purchase requisition only after the appropriate digital signatures have been applied. For workflow operations, it may be desired that the contents of documents not necessarily be completely visible until certain criteria have been met. In such case, the processes of FIGS. 3 and/or 4 can be used to secure the data until the necessary prerequisites are completed. For example, a purchasing clerk is not allowed to see a purchase order until all the necessary management signatures have been obtained. This is useful when dealing with large purchases that are likely to affect the stock prices of small vendors by preventing opportunities for insider trading.

Other applications of the present invention include enforcement of Chinese Wall policies in the professional services sector. Chinese Wall policies split information into sets of mutually exclusive compartments. Once a user has accessed information in one compartment, the user loses the ability to access information in other compartments in that set. This policy is designed to prevent conflicts of interest in professional services firms. For example a lawfirm may serve many clients, say client A and client B who are in competition with each other, and a Chinese Wall may be used to keep the lawyers representing Client A and B from divulging privileged information to each other. The present invention utilizes cryptography to provide a simple, robust mechanism for enforcing these policies.

Another illustrative embodiment of the present invention includes a gaming application. Modem computer simulations (e.g., games) come with a simulated but rich environment. Particularly for multi-player games, the producer of an environment might wish to ensure that a participant (player) has seen only the subset of the environment that corresponds to states they have legitimately entered (i.e., parts of the game that they have played). In other words, game producers would like to keep players from "cheating" by seeing parts of the game that they have not progressed to within the rules of the game. This desire is particularly acute in a multiplayer game, where one would like to discourage cheating among competitors. As an alternative, the present invention allows creation of games played with many players where one could charge for hints or spying info. Thus users cannot cheat. They can progress only by correctly passing through all the necessary states.

An example of a game is a sailing game based on atmospheric data gathered over the Indian Ocean. For sailors, it would be a great advantage to know which way the wind is going to shift. The game computes this from real data, to be more interesting (e.g., this could be pseudorandomly for each game). Gigabytes of weather data may be needed for this. Distributing up to 4.7GB of data is simple: create a DVD-ROM. However, if the data is available, anyone could then cheat, by knowing the climatic model the game uses, and figuring out what portion of the dataset the current simulation is using.

The prior art has state-based security schemes like "cheat codes" whereas the present invention advantageously uses state-based cryptography in which cryptographic operations and keys are themselves functions of both the current state and history of the user or process attempting to perform those cryptographic operations.

Figure 5:
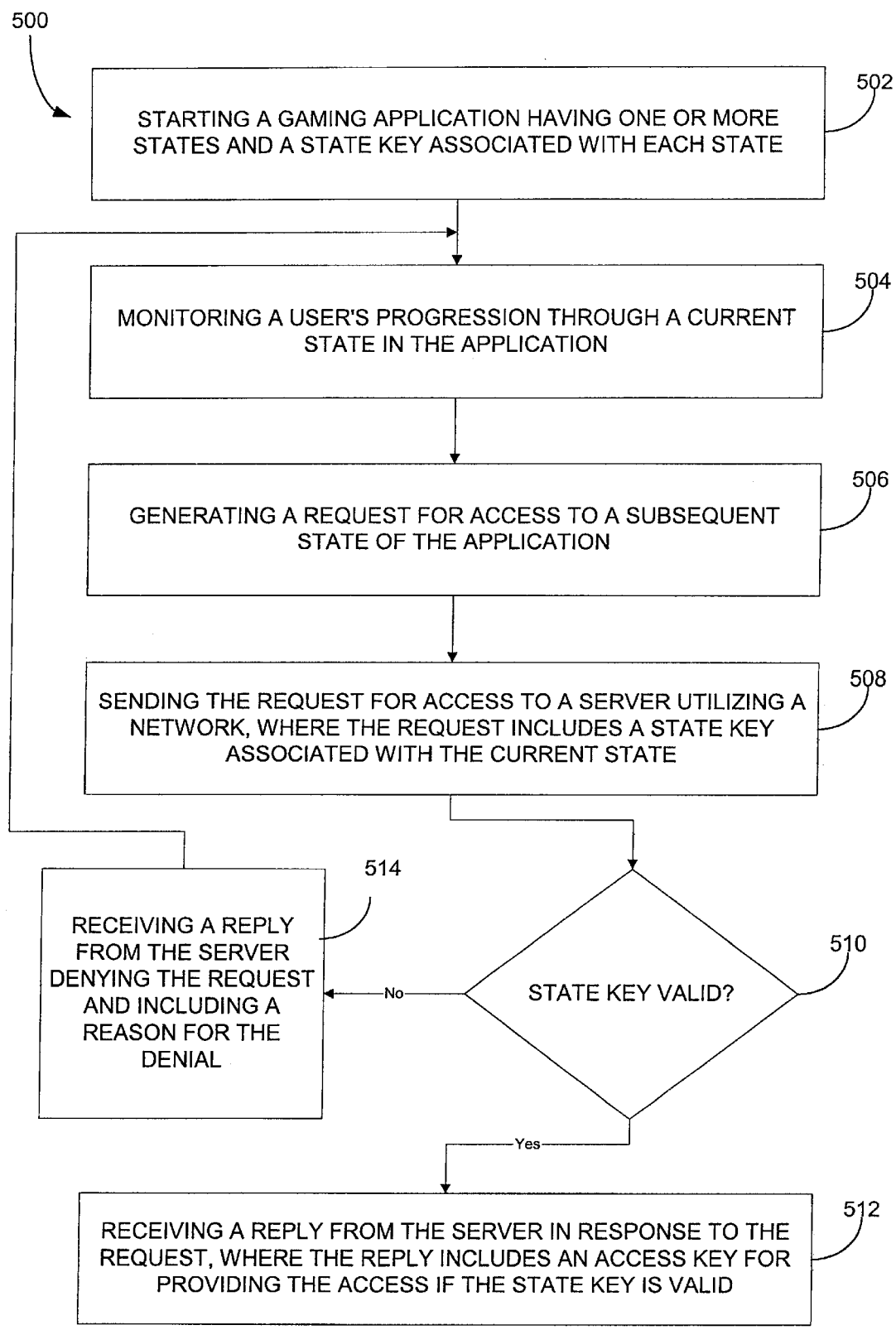
FIG. 5 is a flowchart of a process for preventing cheating in a gaming application using transition state-based cryptography in accordance with another embodiment of the present invention.

FIG. 5 is a flowchart of a process 500 for preventing cheating in a gaming application in accordance with an embodiment of the present invention. In operation 502, the gaming application is started. The gaming application has various states (maps, levels, etc.). Each state has a state key associated with it. In operation 504, the progression of the player through the current state in the application determines whether predefined conditions have been met to allow the player to progress to the next or another state. Such conditions can be, for example, that the player has explored a sufficient portion of a map, made certain discoveries, collected particular items, etc. A state key may be computed or generated based on this data. A request for access to a subsequent state of the application is generated in operation 506 and sent to a server via a network in operation 508. The request, which may be encrypted, includes the state key associated with the current state.

In decision 510, a determination of whether the state key is valid is made. If so, a reply with an access key is received from the server in operation 512. The access key is used to access the next or another state. If the state key is not valid, a reply from the server is received in operation 514. In this case, the reply includes a denial the request, and as an option, also includes a reason for the denial. Such a reason could include a listing of the predefined condition(s) not yet completed.

Figure 6:
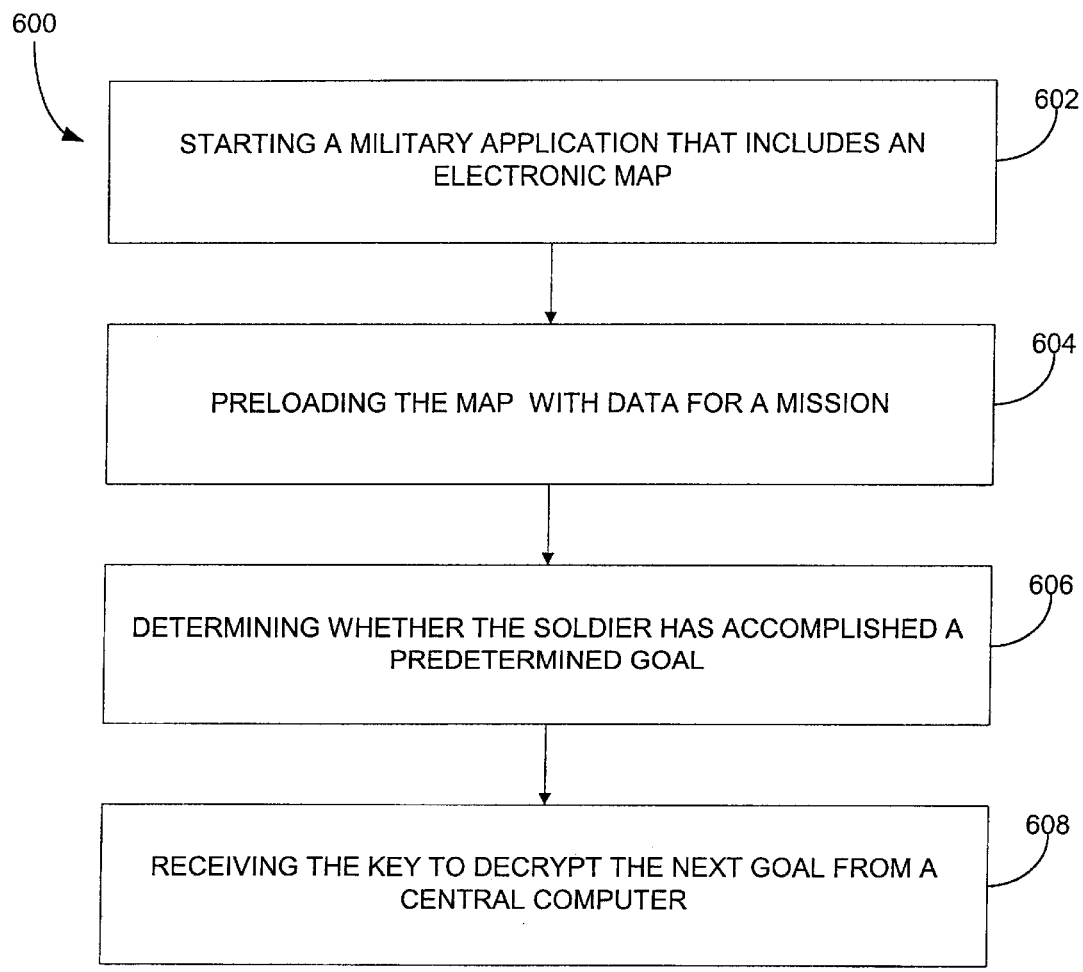
FIG. 6 is a flow diagram of a process for maintaining secrecy of data in a military application.

Military maps benefit from a similar scheme. FIG. 6 is a flow diagram of a process 600 for maintaining secrecy of data in a military application. Encryption allows the data to be distributed (e.g., via DVD-ROM) to users, to allow for low latency access, while maintaining the secrecy of the data. In operation 602, a military application is started. A military application of this idea is an electronic map. In operation 604, the map is preloaded with data for a mission, or longer (e.g., a week's radius of fighting). Optionally, the map data is encrypted using any standard cipher.

In decision 606, a determination is made whether the soldier has accomplished a predetermined goal. If the soldier has accomplished the a goal, the key to decrypt the next goal is received by his electronic map from a central computer in operation 608. (The electronic map might have a built-in GPS receiver and other tamper resistant navigational equipment, so that it could determine its own location.) Until the computer is satisfied that the map is presently where it is supposed to be (or any other appropriately supported goal), no one could learn the location of the next target. This would obviously be useful if the soldier were captured; the map would be useless to the enemy. While this could be accomplished by simply not giving the soldier the map data until it is needed, such an approach has the disadvantage of consuming large quantities of secure, wireless bandwidth, and is also susceptible to interception. Particularly over a satellite, this bandwidth is an expensive resource. As link encryption would be needed, the key management problem is a significant difficulty. The present invention minimizes the need for bandwidth by keeping the data local to the user and revealing the next portion of the data only when appropriate and upon presentation of a valid state key.

Figure 7:
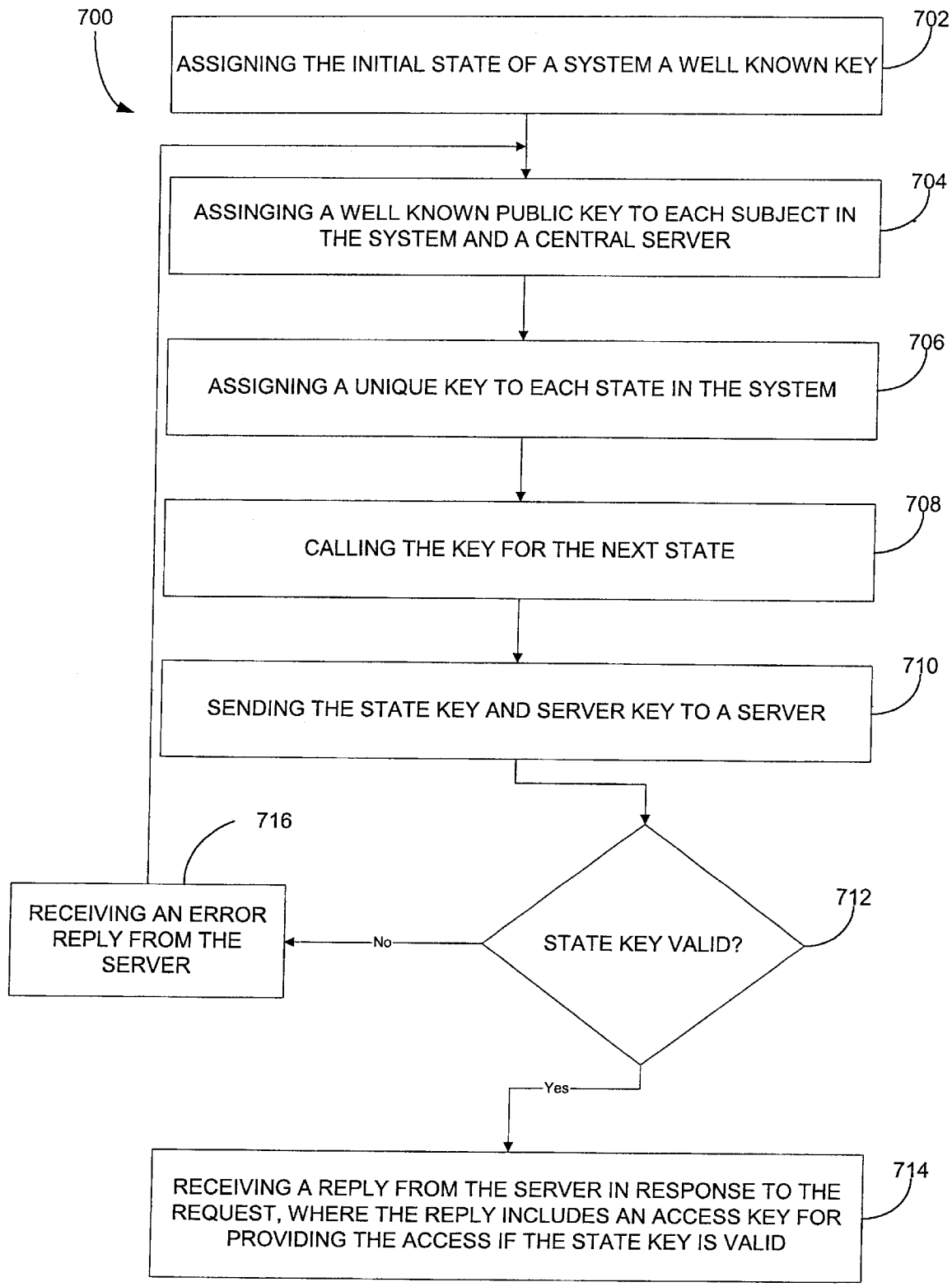
FIG. 7 is a flowchart of a process in which an application is modeled as transitions through a set of states in accordance with an embodiment of the present invention.

FIG. 7 is a flowchart of a process 700 in which an application, such as any of the applications described above, can be modeled as transitions through a set of states in accordance with an embodiment of the present invention. In operation 702, the initial state of the system is assigned a well known key. In operation 704, each subject in the system is assigned a well known public key, $K_C$, and the central server is assigned a well known key, here denoted by $K_{QS}$. Each state in the system is assigned its own key, $K_{CS}$, in operation 706. In operation 708, the key for the next state $K_{CS2}$ is called. In operation 710, at each transition, the client sends $\{K_{CS}, \text{transition}, \text{timestamp}\} K_{QS}$ to the server. A determination of whether the state key is valid is made in decision 712. The server replies with $\{\{K_{CS2}\}K_{CS}\}K_C$ in operation 714 if the request is valid under the current policy. If the request is invalid, the server responds with an error reply in operation 716. A simple inductive argument shows that the client must have followed a legal path through the state space.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for transition state-based cryptography in an application including at least one state having a state key associated therewith, comprising:

(a) sending a request for access to a server via a network upon reaching a state in the application, wherein the request includes a state key and the request for access is for a subsequent state in the application;

(b) receiving a reply from the server in response to the request; and (c) wherein the reply includes an access key for providing the access if the state key is valid.

2. The method as recited in claim 1, wherein the request is encrypted prior to being sent.

3. The method as recited in claim 1, wherein the reply is encrypted.

4. The method as recited in claim 1, wherein the application is a workflow application.

5. The method as recited in claim 1, wherein the access key allows display of a document after a prespecified criterion has been met.

6. The method as recited in claim 1, wherein the application is a game.

7. The method as recited in claim 6, wherein the access key allows progression to a subsequent portion of the game.

8. The method as recited in claim 6, wherein the game is a multiplayer game.

9. The method as recited in claim 1, wherein the application is a military application.

10. The method as recited in claim 9, wherein the military application includes a map.

11. A computer method embodied on a computer readable medium for transition state-based cryptography in an application including at least one state having a state key associated therewith, comprising:

(a) a code segment that sends a request for access to a server utilizing a network upon reaching a state in the application, wherein the request includes a state key associated with the state and the request for access is for a subsequent state in the application;

(b) a code segment that receives a reply from the server in response to the request; and (c) wherein the reply includes an access key for providing the access if the state key is valid.

12. The computer program as recited in claim 11, wherein the request is encrypted prior to being sent.

13. The computer program as recited in claim 11, wherein the reply is encrypted.

14. The computer program as recited in claim 11, wherein the application is a workflow application.

15. The computer program as recited in claim 11, wherein the access key allows display of a document after a pre-specified criterion has been met.

16. The computer program as recited in claim 11, wherein the application is a game.

17. The computer program as recited in claim 16, wherein the access key allows progression to a subsequent portion of the game.

18. The computer program as recited in claim 16, wherein the game is a multiplayer game.

19. The computer program as recited in claim 11, wherein the application is a military application.

20. The computer program as recited in claim 19, wherein the military application includes a nap.

21. A system for transition state-based cryptography in an application including at least one state having a state key associated therewith, comprising:

(a) logic that sends a request for access to a server utilizing a network upon reaching a state in the application, wherein the request includes a state key associated with the state and the request for access is for a subsequent stare in the application;

(b) logic that receives a reply from the server in response to the request; and (c) wherein the reply includes an access key for providing the access if the state key is valid.

22. The system as recited in claim 21, wherein the request is encrypted prior to being sent.

23. The system as recited in plain 21, wherein the reply is encrypted.

24. The system as recited in claim 21, wherein the application is a workflow application.

25. The system as recited in claim 21, wherein the access key allows display of a document after a prespecified criterion has been met.

26. The system as recited in claim 21, wherein the application is a game.

27. The system as recited in claim 26, wherein the access key allows progression to a subsequent portion of the game.

28. The system as recited in claim 26, wherein the game is a multiplayer game.

29. The system as recited in claim 21, wherein the application is a military application.

30. The system as recited in claim 29, wherein the military application includes a map.

31. A method for transition state-based cryptography in an application including at least one state having a state key associated therewith, comprising:

(a) receiving a request for access from a client to a server utilizing a network wherein the request for access is for a subsequent state in the application;

(b) verifying the state key at the server; and (c) sending a reply from the server in response to the request, wherein the reply includes an access key for providing the access if the state key is verified.

32. The method as recited in claim 31, wherein the application is a workflow application.

33. The method as recited in claim 31, wherein the application is a game.

34. The method as recited in claim 31, wherein the application is a military application.

* * * * *